United States Patent [19]

Jezo

[11] 4,143,376  
[45] Mar. 6, 1979

[54] METHOD FOR SAMPLING TACAN SIGNAL ENVELOPE

[75] Inventor: Maurice L. J. Jezo, Cedar Grove, N.J.

[73] Assignee: International Telephone & Telegraph Corp., Nutley, N.J.

[21] Appl. No.: 840,943

[22] Filed: Oct. 11, 1977

[51] Int. Cl.² ............................................. G01S 1/44
[52] U.S. Cl. ................................ 343/106 R; 343/6 R
[58] Field of Search .......................... 343/6 R, 106 R

[56] References Cited

U.S. PATENT DOCUMENTS

| 3,167,759 | 1/1965 | Villiers | 343/6 R |
| 3,836,864 | 9/1974 | Jezo | 343/106 R X |

Primary Examiner—T.H. Tubbesing

Attorney, Agent, or Firm—John T. O'Halloran; Alfred C. Hill

[57] ABSTRACT

This invention relates to a method for supplying samples of the received signal envelope in airborne Tacan equipment to the airborne bearing circuitry. During the DME search phase, the airborne DME equipment searches for only those replies which have been received in response to the airborne equipment's own interrogations. After locking onto its own replies, said replies form the samples of the received signal envelope which are applied to a phase locked oscillator, the output of which is coupled to the bearing circuitry both before and after phase shifting. As a result, the airborne receiver duty cycle for Tacan functions is greatly reduced.

3 Claims, 1 Drawing Figure

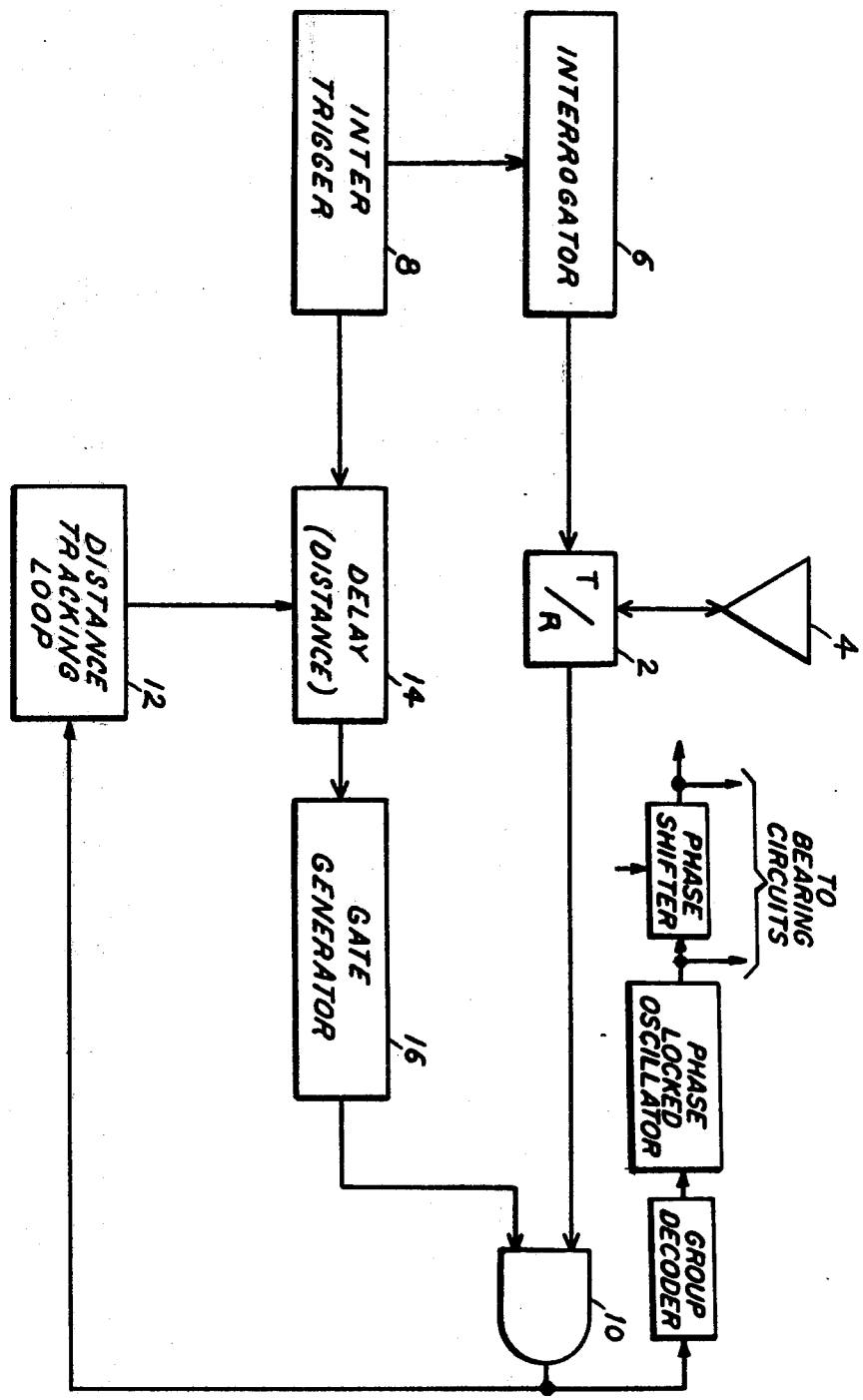

METHOD FOR SAMPLING TACAN SIGNAL ENVELOPE

BACKGROUND OF THE INVENTION

This invention relates to a method of providing received signal samples to a Tacan bearing determining apparatus of the type shown and described in U.S. Pat. No. 3,836,864 entitled "Method and Apparatus for Determining Tacan Bearing" by the same inventor.

The use of Tacan permits an aircraft to determine its position relative to a ground beacon. Tacan employs a radio aerial navigation system of the polar coordinate type wherein there is a bearing facility that provides on the aircraft a meter indication of its direction in degrees of bearing from the ground beacon selected by the pilot. There is also a distance facility that provides a meter indication in nautical miles of its distance from said ground beacon. The pilot can fix his position on a chart by knowing his bearing and distance from a specific geographic point. The concepts and operational characteristics of Tacan systems are well known and a detailed description may be found in MIL-Standard 291B.

As stated in the above cited U.S. patent, it was necessary that the received antenna modulation components be sampled at a sufficiently high rate in order to reconstruct the modulation envelope. Since some 2700 pulses per second are produced by a Tacan ground transmitter and are supplied to the airborne antenna, it is necessary that the receiver be dedicated to receiving a sample for approximately 370 μs for each sample. Some of the 2700 pulses per second may be distance measurement reply pulses, while others are random filler pulses, commonly referred to as squitter. While this represents a substantial decrease in duty cycle requirement over a constant duty cycle type of operation, it is still desirable to reduce receiver utilization for Tacan functions even further in order to accommodate other receiver functions; e.g. IFF. A complete description of Tacan bearing and distance measuring characteristics may be found in Electrical Communication, Technical Journal of the International Telephone and Telegraph Corporation and Associate Companies, Volume 33, No. 1, March 1956.

An apparatus which is operational at a reduced receiver sampling rate in order to free the receiver to perform additional desired functions is disclosed in the above cited patent.

Receiver output samples are applied to a group decoder which separates reference groups and applies them to a phase locked oscillator which is triggered at its zero point by the pulse groups. The oscillator output is then applied to a phase shifter which shifts the applied signal in a direction of coincidence with the envelope of the received signal samples. The outputs of the oscillator and the phase shifter are then applied to the bearing determination circuitry.

While the arrangement of the above cited patent operates to provide bearing information based on a reduced receiver sampling rate, no attention was given to the means by which these samples are derived.

SUMMARY OF THE INVENTION

It is an object of the present invention to provide a method for producing samples of the received signal envelope for application to bearing determining circuitry while at the same time consuming a minimum amount of receiver duty cycle.

BRIEF DESCRIPTION OF THE DRAWINGS

The above and other objects of the present invention will be more clearly understood from the following detailed description taken in conjunction with the accompanying drawing which is a functional block diagram of an airborne Tacan receiver apparatus which provides samples of the received signal envelope for subsequent use by the system's bearing determination circuitry.

DESCRIPTION OF THE PREFERRED EMBODIMENT

The drawing shows, in functional form, the interrogation and distance measuring apparatus of an airborne Tacan equipment. The airborne transmitter-receiver 2 repeatedly sends out, via antenna 4, very narrow and widely spaced interrogation pulses. This is accomplished by triggering interrogator unit 6 by interrogation trigger 8. These interrogation pulses are received by a ground beacon which responds by sending out reply pulses. The reply pulses are picked up by the airborne transmitter-receiver 2 and are applied to an analog AND-gate 10.

Assuming for the time being that the analog AND-gate 10 has been enabled, the output of gate 10 is applied to distance tracking loop 12.

Since a ground beacon may be interrogated simultaneously by a number of aircraft that are in the vicinity, the ground beacon will reply to all interrogations and each airplane will receive all the replies being transmitted. Therefore, to permit interference-free operation under these conditions, use is made of a stroboscopic search process to sort out from among all the pulses received those that are replies to its own interrogations. The strobe locates the reply pulses by finding the one fixed or very slowly changing time delay, measured from its own previous interrogation pulse, at which a reply pulse is repeatedly received. The strobe scans over various time delay intervals by means of a sliding range gate or time slot. It quickly tests each time slot position for the number of successive reply pulses received within a certain uniform checking period. If no replies or only sporadic replies are received, the strobe advances the range gate to test a slightly longer time delay interval, etc. When, at some particular time delay interval, evidence of recurrent replies is detected by a counting process, the strobe has completed its search and stops. These replies are the only ones that are constantly received in synchronism with the interrogation pulses. After the strobe locks onto the proper reply signals, the system converts to a tracking mode of operation. Then the delay setting of the range gate automatically and continuously follows any normal variations in the time delay of the proper reply pulses. Such variations will occur as the distance between the airplane and the beacon is actually changing as a result of its flight path. This is accomplished by distance relay 14, which is triggered by the interrogation trigger 8 and cooperates with the distance tracking loop 12. The distance relay unit 14 controls a gate generator 16 which operates to enable gate 10 during the gate period. It should be clear now that the output of analog gate 10 consists of solely those replies to the airborne interrogator's own interrogations. It should also be emphasized that gate 10 is an analog AND-gate which does not destroy amplitude information.

It is to be emphasized that stroboscopic and range gating techniques are well known to those skilled in the art and that the contents of distance tracking loop 12, delay unit 14 and gate generator 16 may be constructed in a variety of ways by the skilled practitioner depending on specific requirements and design limitations.

Referring to the above cited patent, receiver samples are applied to a group decoder which in turn applies them to a phase locked oscillator which is triggered at its zero point by the samples. The output of the oscillator is applied to a phase shifter which shifts the applied signal in the direction of coincidence with the envelope of the received signal samples. The output of the oscillator and the phase shifter is applied to the bearing determination circuitry. In accordance with the present invention, the output of analog AND-gate 10 is applied to the above mentioned group decoder as illustrated in the drawing. In this manner, the receiver must be dedicated to Tacan functions for a small duration of time corresponding to a gate produced by gate generator 16 sufficient in length to encompass the expected reply signal, typically 20 microseconds. Therefore, the receiver duty cycle time has been reduced by a factor of 1/20 representing a substantial savings.

We claim:

1. An improved method for providing input signal information to the bearing circuits of Tacan airborne equipment of the type which generates interrogation signals which are received by a ground beacon, which in turn transmits to the airborne equipment reply signals in response to the interrogation signals, and wherein samples of the received signal envelope trigger a phase locked oscillator in the airborne equipment, the output of said phase locked oscillator being applied to the airborne bearing circuitry both before and after phase shifting, wherein the improvement comprises:
   detecting those reply signals which were generated by said beacon in response to interrogation by said airborne equipment; and
   applying said detected reply signals as said samples to said phase locked oscillator.

2. A method according to claim 1 wherein said detecting includes generating a gate signal at preselected times during which reply signals responsive to the airborne equipment's own interrogations are expected.

3. A method according to claim 2 wherein said detecting further includes applying the received reply signals to a gate and enabling said gate during said preselected times.

* * * * *